United States Patent [19]
Hayes et al.

[11] Patent Number: 6,057,389
[45] Date of Patent: May 2, 2000

[54] CURABLE COMPOSITIONS

[75] Inventors: Barry James Hayes, Little Eversden; Kevin Brian Hatton, Bishop's Stortford; Jeffery Grant, Sawston, all of United Kingdom

[73] Assignee: Ciba Specialty Chemicals Corp., Tarrytown, N.Y.

[21] Appl. No.: 09/022,754

[22] Filed: Feb. 12, 1998

[30] Foreign Application Priority Data

Feb. 12, 1997 [GB] United Kingdom .................... 9702871

[51] Int. Cl.⁷ ................ C08K 3/36; C08L 63/02
[52] U.S. Cl. .......... 523/466; 523/443; 525/504; 525/523; 528/93; 528/94
[58] Field of Search ............... 525/504, 523; 528/93, 94; 523/443, 466

[56] References Cited

U.S. PATENT DOCUMENTS

| | | | |
|---|---|---|---|
| 4,320,047 | 3/1982 | Murphy et al. | 523/466 |
| 4,661,539 | 4/1987 | Goel | 523/466 |
| 4,920,164 | 4/1990 | Sasake et al. | 523/466 |
| 5,204,386 | 4/1993 | Erun-Hallsby et al. | 523/443 |
| 5,367,006 | 11/1994 | Hermansen et al. | 523/466 |
| 5,468,461 | 11/1995 | Hosoda et al. | 523/466 |

FOREIGN PATENT DOCUMENTS

| | | |
|---|---|---|
| 0199889 | 11/1986 | European Pat. Off. |
| 0249940 | 12/1987 | European Pat. Off. |
| 1072272 | 6/1967 | United Kingdom |
| 9512647 | 5/1995 | WIPO |
| 9731061 | 8/1997 | WIPO |

OTHER PUBLICATIONS

CA:76:142493, Whittemore et al.; "Shelf–Stable epoxy resin . . . ", Nov. 28, 1969.

*Primary Examiner*—Robert Dawson
*Assistant Examiner*—D. Aylward
*Attorney, Agent, or Firm*—Michele A. Kovaleski

[57] ABSTRACT

The present invention provides pourable curable composition which comprises the product obtained by mixing (a) a liquid epoxy resin containing a sufficient amount of a thixotropic agent to induce thixotropic properties with (b) a hardener composition which contains a tertiary amine compound in an amount sufficient to at least cause the mixture to become pourable after mixing.

8 Claims, No Drawings

CURABLE COMPOSITIONS

The present invention relates to curable epoxy resin compositions.

In many applications there is a need for an epoxy composition which is non flowing but which, on mixture with the hardener quickly develops a decrease in texture even up to the point of being readily pourable.

Such applications are widespread and include adhesives, sealing compounds, self levelling coatings, encapulants casting compounds and coating compositions amongst others.

Dispensing of such epoxy compositions may be from bottles, cans, tubes, sachets and drums for instance and sometimes may be mixed with the hardener components via static or dynamic mixer heads.

There are some very demanding applications where epoxy resin and filler blends are required to exhibit no settlement during long periods of storage but on mixing with the hardener should rapidly assume a pourable consistency.

Historical attempts to produce a suitable product to satisfy these requirements have usually resulted in heavily thixotropic and viscous resins which are difficult to handle.

We have now developed epoxy resin systems which are non flowing and non settling even when containing fillers and are easy to handle but which rapidly develop a flowing consistency on mixing with an amine hardener.

Accordingly the present invention provides a pourable curable composition which comprises the product obtained by mixing (a) a liquid epoxy resin containing a sufficient amount of a thixotropic agent to induce thixotropic properties with (b) a hardener composition which contains a tertiary amine compound in an amount sufficient to at least cause the mixture to become pourable after mixing.

The invention also provides a two part pack comprising a first part containing (a) a liquid epoxy resin containing a sufficient amount of a thixotropic agent to induce thixotropic properties, and a second part containing (b) a hardener composition which contains a tertiary amine, the two parts on mixing giving a pourable curable composition.

The liquid resin may be a polyglycidyl ether of a polyhydric alcohol or phenol such as 2,2-bis(4-hydroxyphenyl) propane (Bisphenol A), bis(4-hydroxyphenyl)methane (Bisphenol F), a phenol-formaldehyde novolak or a cresol-formaldehyde novolak or mixtures thereof and contain epoxy functional diluents if required. Non epoxy functional diluents may also be employed provided that they do not prevent the final resin composition from achieving long term suspension of any added fillers. Typical non functional diluents include benzyl alcohol, butyl benzoate and blends of isomers of diisopropyl naphthalene.

Suitable thixotropic systems may be based on the hydrophilic fumed silicas which largely rely on interparticle hydrogen bonding to achieve this effect. The effect may be enhanced by the addition of certain polypolar compounds. Suitable polypolar additives include polyols, polyethers and polyesters and the like either individually or in combination.

Sufficient thixotropic system is used to achieve the required thickening of the epoxy resin liquid. Depending on the specific resin composition and the grade of hydrophilic silica used, the amount of hydrophilic silica may be from 1 to 20% by weight, based on the weight of epoxy resin, preferably 3 to 12% by weight. The polypolar additives may be used in any amount but are usually most useful at levels of up to 10% by weight based on the resin composition weight.

The hardener composition suitable to give breakdown of the resin composition after mixing to a pourable state consists either of tertiary amines alone or blends of these with other primary or secondary amines. Suitable tertiary amine hardener leading to this breakdown of structure in the resin composition include aliphatic, cycloaliphatic, araliphatic, heterocyclic and aromatic amines. Examples of the amines are N, N, N', N'-tetramethyl-1,6-hexane diamine, diazabicyclooctane, N,N-dimethyl cyclohexylamine, tris N, N-dimethylamino methyl phenol, N,N-dimethylamino-4-pyridine and N,N-dimethyl amino-4-toluidine, N,N-diethyl-1,3-propanediamine, N,N-dimethylpropylenetriamine. The most effective amine appears to be diazabicyclooctane.

The amount of the tertiary amine employed should be sufficient to destroy as much of the thixotropic properties of the epoxy resin composition as required. The actual amount needed varies according to the specific compounds used but in general at least about 0.5% by weight of tertiary nitrogen based on the weight of hydrophilic silica is needed. More can be used as required even up to the level where the tertiary amine is the only hardener for the epoxy resin.

Fillers may also be present in the epoxy resins. The fillers which are often an important part of the epoxy resin compositions may be of any type provided they are stable chemically in the resin mixture. They may be of any density. Thus by using this invention, storage stable resin compositions of either high or low density may be produced which are converted to castable flowable mixtures on addition of the hardener.

The filler used in the thixotropic composition (a) may be a filler conventionally used in epoxide resin compositions to impart the desired physical properties to the cured resin product. Thus suitable fillers include calcium carbonate, calcium sulphate, barium sulphate, magnesium carbonate, metal powders such as aluminium and iron powders, aluminium silicate, magnesium silicate, hydrated alumina, tabular alumina, silica flour, sand, zirconium silicate, lithium aluminium silicate, magnesium aluminium silicate, iron oxide, mica, dolomite, wollastonite, talc, wood flour, fibrous fillers e.g, glass, carbon or cellulosic fibres, glass beads, hollow glass or silicaceous microspheres and organic polymer fillers such as powdered polypropylene and poly (vinylidene chloride) microspheres. Mixtures of two or more of these fillers can be used.

As will be understood by those skilled in formulating epoxide resin compositions, the amount of filler incorporated in the thixotropic composition (a) may vary according to the purpose for which the curable composition is to be used and according to the properties required in the cured product. This amount may be an amount conventionally used in epoxide resin compositions for the same end use and may vary according to the density of the filler. In general the weight ratio of filler to epoxide resin or, where a diluent is present, filler to epoxide resin plus diluent, may be from 0.05:1 to 5:1. For most applications, this weight ratio is preferably from 0.1:1 to 3:1, especially from 0.75:1 to 3:1 for fillers denser than the resin, or mixture of resin and diluent, and from 0.1:1 to 0.5:1 for fillers less dense than the resin, or mixture of resin and diluent.

The mixture is then cured at ambient temperature or by heating.

The invention is illustrated by the following Examples.

EXAMPLE 1

Formulations are made as in the Tables below using a bisphenol A epoxy resin, GY260, having an epoxy value of 5.3 g mols epoxy per kilogramme a thixotrope and mono and polypolar compounds to adjust the viscosity and non flow properties.

| Resin A | |
|---|---|
| GY 260 | 8.96 g |
| Aerosil A 380 | 0.45 g |
| Benzyl alcohol | 0.54 g |
| Glycerol | 0.05 g |

10 grams of this composition, which is a soft, non flowing paste are mixed in individual experiments with the amines shown in the table below to produce free flowing liquids.

TABLE

| AMINE | MASS USED | MASS OF TERTIARY NITROGEN |
|---|---|---|
| NNN'N'-tetramethyl hexane 1,6 diamine | 0.076 g | 0.012 g |
| tris-2,4,6-dimethylamino methyl phenol | 0.084 g | 0.013 g |
| NN-dimethylcyclohexylamine | 0.120 g | 0.013 g |
| diazabicyclooctane | 0.019 g | 0.005 g |
| NN-dimethylamino-4-toluidine | 0.408 g | 0.041 g |
| tri-n butylamine | 0.300 g | 0.023 g |
| N,N-diethyl-1,3-propanediamine | 0.336 g | 0.034 g |
| N,N-dimethyldipropylene triamine | 0.168 g | 0.017 g |

EXAMPLE 2

Diazabicyclooctane is added to and dissolved in a widely used primary/secondary aliphatic amine curing agent for epoxy resins, HY956. This is compared on mixing with Resin A to HY 956 without the addition of diazabicyclooctane.

| | B | C |
|---|---|---|
| Resin A | 10.00 g | 10.00 g |
| HY 956 | 1.98 g | 1.98 g |
| diazabicyclooctane | — | 0.22 g |

When thoroughly mixed B is a firm waxy blend which gels without flowing, whereas mixture C rapidly develops an easily pourable consistency.

EXAMPLE 3

A 33% solution of diazabicyclooctane in dipropylene glycol is used to modify the flow behaviour of a conventional polyaminoamide hardener for epoxy resins, Versamid 140.

| | D | E |
|---|---|---|
| Resin A | 10.00 g | 10.00 g |
| Versamid 140 | 4.50 g | 4.50 g |
| diazabicyclooctane 33% in dipropylene glycol | — | 0.35 g |

Mix D is a very viscous almost non flowing blend whereas Mix E flows readily and is easily pourable.

We claim:

1. A pourable curable composition which comprises the product obtained by mixing:
   (a) a liquid epoxy resin based on a polyglycidyl ether of a polyhydric alcohol or phenol selected from the group consisting of 2,2-bis-4-hydroxyphenylpropane (Bisphenol A), bis-4-hydroxyphenylpropane (Bisphenol F), a phenol-formaldehyde novolak and a cresol-formaldehyde novolak and mixtures thereof, which resin contains 1 to 20% by weight, based on the weight of the epoxy resin, of hydrophilic fumed silica to induce thixotropy; with
   (b) a hardener composition which contains a tertiary amine compound selected from the group consisting of N,N,N',N'-tertamethylhaxane-1,6-diamine, diazabicyclooctane, N,N-dimethylcyclohexylamine, tris-N,N-dimethylaminomethylphenol, N,N-dimethylamino-4-pyridine, N,N-diemthylaminoamino-4-toluidine, N,N-diethyl-1,3-propanediamine, N,N-dimethylpropyleneteiamine, tris-2,4,6-dimethylaminomethylphenol and tri-n-butylamine,
   wherein the amount of the tertiary amine compound is sufficient to let the curable composition develop a flowing consistency after mixing.

2. The composition of claim 1 in which the epoxy resin is a polyglycidyl ether of a polyhydric alcohol or phenol.

3. The composition of claim 1 in which the thixotropic agent is a hydrophilic fumed silica.

4. The composition of claim 1 in which the tertiary amine is in admixture with a primary or secondary amine.

5. The composition of claim 1 in which the amount of tertiary amine is at least 0.5% by weight based on the weight of thixotropic agent.

6. The composition of claim 1 in which the epoxy resin (a) contains an additional filler.

7. A pourable curable composition which comprises the product obtained by mixing:
   (a) a polyglycidyl ether of a polyhydric alcohol or phenol selected from the group consisting of 2,2-bis-4-hydroxyphenylpropane (Bisphenol A), bis-4-hydroxyphenylpropane (Bisphenol F), a phenol-formaldehyde novolak and a cresol-formaldehyde novolak and mixtures thereof containing a sufficient amount of hydrophilic fumed silica; with
   (b) a hardener composition which contains diazabicyclooctane.

8. A two part pack comprising a first part containing
   (a) a liquid epoxy resin based on a polyglycidyl ether of a polyhydric alcohol or phenol selected from the group consisting of 2,2-bis-4-hydroxyphenylpropane (Bisphenol A), bis-4-hydroxyphenylpropane (Bisphenol F), a phenol-formaldehyde novolak and a cresol-formaldehyde novolak and mixtures thereof, which resin contains 1 to 20% by weight, based on the weight of the epoxy resin, of hydrophilic fumed silica to induce thixotropy; and a second part containing
   (b) a hardener composition which contains a tertiary amine compound selected from the group consisting of N,N,N',N'-tertamethylhaxane-1,6-diamine, diazabicyclooctane, N,N-dimethylcyclohexylamine, tris-N,N-dimethylaminomethylphenol, N,N-dimethylamino-4-pyridine, N,N-diemthylaminoamino-4-toluidine, N,N-diethyl-1,3-propanediamine, N,N-dimethylpropylenetriamine, tris-2,4,6-dimethylaminomethylphenol and tri-n-butylamine,
   wherein the amount of the tertiary amine compound is sufficient to let the two part pack develop a flowing consistency after mixing to give a pourable curable composition.

* * * * *